March 8, 1927.
P. H. GEIGER
1,620,015
RAILWAY SIGNALING APPARATUS
Filed Sept. 14, 1926
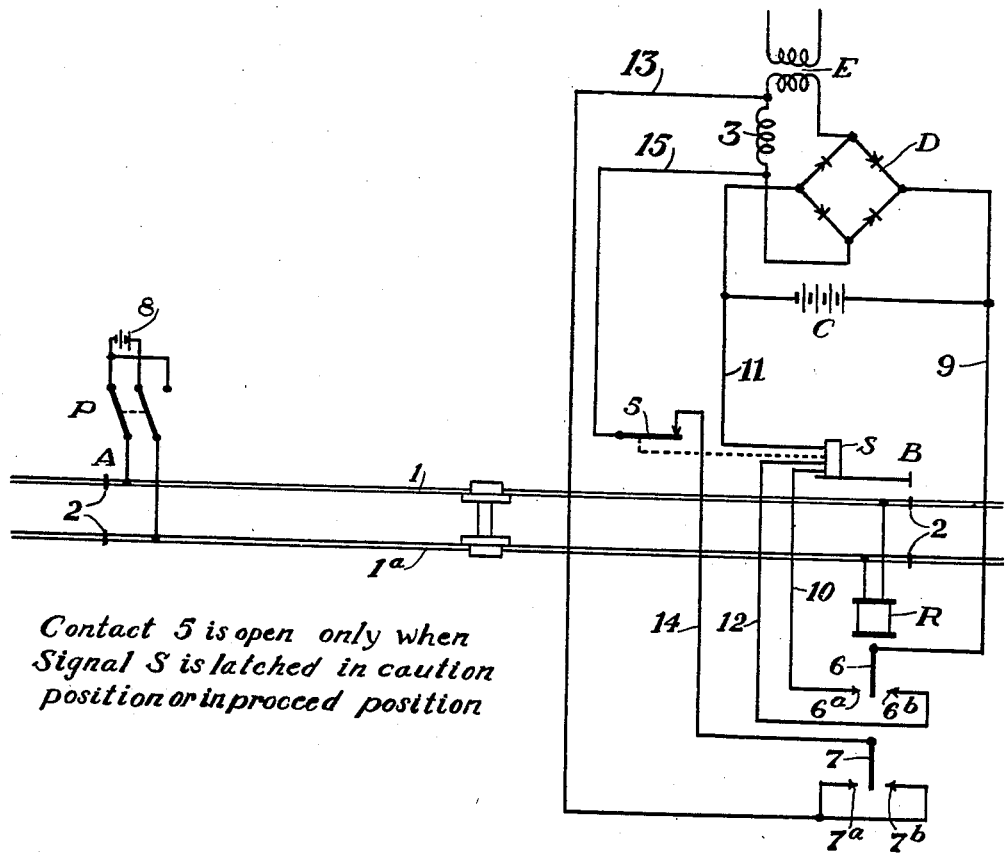
Contact 5 is open only when Signal S is latched in caution position or in proceed position
INVENTOR:
P. H. Geiger,
by A. R. Vincill
His attorney Patented Mar. 8, 1927.

1,620,015

UNITED STATES PATENT OFFICE.

PAUL H. GEIGER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-SIGNALING APPARATUS.

Application filed September 14, 1926. Serial No. 135,482.

My invention relates to railway signaling apparatus, and particularly to apparatus of the type wherein signals are operated from batteries which in turn are constantly charged from an alternating current source through rectifiers.

One feature of my invention is the provision in apparatus of this character of means operating when the signal is to be moved for increasing the output of the rectifier to a value sufficient to move the signal, thereby preventing a failure of the signal in the event of a failure of the battery.

I will describe one form of apparatus embodying my invention, and will then point out the novel features thereof in claims.

The accompanying drawing is a diagrammatic view showing one form of apparatus embodying my invention.

Referring to the drawing, the reference characters 1 and 1ª designate the rails of a track section A—B which is electrically insulated from the adjoining portions of track by insulated joints 2. The section A—B is provided with a track circuit comprising a track battery 8, a track relay R, and a polechanger P for reversibly connecting the battery 8 with the rails of the section. The relay R responds to reversals of the track circuit current. Section A—B is provided with a signal S of the semaphore type, which signal is normally supplied with operating current by a storage battery C and is controlled by the track relay R in the usual manner. Battery C is maintained in its charged condition from a source of alternating current E through a rectifier D. The output of the rectifier D is normally of sufficient value to keep the battery C properly charged but is insufficient to move the signal S from its stop position to its caution position or from its caution position to its proceed position. This limitation on the output of the rectifier D is accomplished by an impedance 3 interposed between the rectifier and the transformer E.

The control of the signal S by relay R, is as follows: When the relay is de-energized, both circuits for the signal are open, and so the signal indicates stop. When the relay is energized in such direction that its left-hand contact 6—6ª is closed, the caution indication circuit for signal S is closed, which circuit is from battery C, through wire 9, contact 6—6ª, wire 10, operating mechanism of signal S, and wire 11 to battery C. When the track relay R is energized in the other direction, the proceed indication circuit of signal S is closed, which circuit is from battery C, through wire 9, contact 6—6ᵇ, wire 12, operating mechanism of signal S, and wire 11 to battery C.

The impedance 3 is at times placed on short circuit through wire 15, a contact 5 operated by the signal S, wire 14, a contact 7 of track relay R and wire 13. Contact 5 is normally closed, but is opened when the signal is latched in the caution or in the proceed position; for example, this contact may be the contact 2—3 shown in Letters Patent of the United States, No. 1,298,938, granted to C. O. Harrington on April 1, 1919.

The operation of the apparatus is as follows: When track relay R is de-energized signal S is at stop, as hereinbefore stated, and the short circuit path around impedance 3 is open at contact 7 of the track relay. When relay R becomes energized in either direction, the caution or the proceed indication circuit for signal S will be closed, and the short circuit path around impedance 3 will also be closed at contact 7—7ª or contact 7—7ᵇ. When the signal becomes latched in either the caution or the proceed position, contact 5 will open, thereby opening the short circuit path around impedance 3.

When impedance 3 is placed on short circuit the output of rectifier D is sufficient to move the signal S to caution or proceed position, and, consequently, it will be seen that in the event of a failure of battery C, signal S will nevertheless be operated upon energization of relay R and so there will be no traffic delay due to the battery failure.

The output of rectifier D even when impedance 3 is not placed on short circuit is sufficient to hold signal S in either the caution or the proceed position.

Among the advantages of my invention are the following:

Possibility of signal failure due to failure of the signal operating power supply is greatly reduced, because operation of the signal is accomplished by either the battery alone or the alternating current supply alone. The signal will operate when the battery is removed for repair or inspection, because the current supplied by the rectifier D when contact 5 is open is sufficient to energize the holding magnet in the signal. The normal charging rate for the battery will be less than in the usual trickle charge system, because when a signal is to be moved, the rectifier output is increased to an amount equal to the power required to move the signal. The normal charging rate for the battery C may be made independent of the number of signal operations in a given length of time, because the charge continuously supplied to the battery need be only sufficient to supply leakage losses. The charging rate will, therefore, be the same on a busy section of the track as on one seldom used. The rectifier D need be no larger than that which is used in the ordinary trickle charge system, because the time during which the rectifier is overloaded is so short that it will not be injured.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a railway signaling system of the type comprising a source of alternating current, a storage battery, a trickle charge rectifier constantly charging said battery from said source at a relatively low rate, and a signal operated by said battery; the combination with the aforementioned instrumentalities of means controlled by said signal for at times increasing the output of said rectifier.

2. In a railway signaling system of the type comprising a source of alternating current, a storage battery, a trickle charge rectifier constantly charging said battery from said source at a relatively low rate, and a signal operated by said battery; the combination with the aforementioned instrumentalities of means operating when said signal is to be moved for increasing the output of said rectifier to a value sufficient to move the signal.

3. In a railway signaling system of the type comprising a source of alternating current, a storage battery, a trickle charge rectifier constantly charging said battery from said source at a relatively low rate, and a signal operated by said battery; the combination with the aforementioned instrumentalities of an impedance for limiting the output of said rectifier, and means for placing said impedance on short circuit when said signal is to be moved.

4. In a railway signaling system of the type comprising a source of alternating current, a storage battery, a trickle charge rectifier for constantly charging said battery from said source at a relatively low rate, and a signal operated by said battery; the combination with the aforementioned instrumentalities of an impedance for limiting the output of said rectifier, a normally closed contact operated by said signal and opened only when the signal is latched in the caution or the proceed position, and a path of low resistance around said impedance including said contact.

5. In a railway signaling system of the type comprising a source of alternating current, a storage battery, a trickle charge rectifier for constantly charging said battery from said source at a relatively low rate, a signal operated by said battery and a track relay controlling said signal; the combination with the foregoing instrumentalities of means controlled jointly by said signal and said relay for at times increasing the output of said rectifier.

6. In a railway signaling system of the type comprising a source of alternating current, a storage battery, a trickle charge rectifier for constantly charging said battery from said source at a relatively low rate, a signal operated by said battery, and a track relay controlling said signal; the combination with the foregoing instrumentalities of means acting when said relay is energized and said signal is to be moved for increasing the output of said rectifier to a value sufficient to move the signal.

7. In a railway signaling system of the type comprising a source of alternating current, a storage battery, a trickle charge rectifier for constantly charging said battery from said source at a relatively low rate, a signal operated by said battery, and a track relay controlling said signal; the combination with the foregoing instrumentalities of an impedance for limiting the output of said rectifier; a normally closed contact operated by said signal and opened only when the signal is latched in the caution or the proceed position, and a low resistance shunt around said impedance including in series said contact and a contact of said track relay closed only when the relay is energized.

8. In a railway signaling system of the type comprising a battery, a signal normally operated by said battery, a source of alternating current, and a rectifier for normally charging said battery from said source at a rate sufficient to keep the battery charged but insufficient to move said signal, the combination with the aforesaid instrumentalities of means operating when said signal is to be moved for increasing the output of said rectifier to a value sufficient to move the signal.

In testimony whereof I affix my signature.

PAUL H. GEIGER.